United States Patent
Pratt

(10) Patent No.: US 9,903,403 B2
(45) Date of Patent: Feb. 27, 2018

(54) FASTENER AND METHOD OF INSTALLING SAME

(71) Applicant: John D. Pratt, Laguna Niguel, CA (US)

(72) Inventor: John D. Pratt, Laguna Niguel, CA (US)

(*) Notice: Subject to any disclaimer, the term of this patent is extended or adjusted under 35 U.S.C. 154(b) by 41 days.

(21) Appl. No.: 15/049,709

(22) Filed: Feb. 22, 2016

(65) Prior Publication Data

US 2016/0169260 A1    Jun. 16, 2016

Related U.S. Application Data

(63) Continuation-in-part of application No. 13/791,088, filed on Mar. 8, 2013, now Pat. No. 9,284,971.

(60) Provisional application No. 61/620,296, filed on Apr. 4, 2012.

(51) Int. Cl.
*F16B 19/10* (2006.01)
*F16B 13/04* (2006.01)

(52) U.S. Cl.
CPC .......... *F16B 19/1063* (2013.01); *F16B 13/04* (2013.01); *Y10T 29/49956* (2015.01)

(58) Field of Classification Search
CPC ...... F16B 13/04; F16B 13/061; F16B 13/066; F16B 19/1054; F16B 19/1063; F16B 19/1081; Y10T 29/49956

USPC ................... 411/34, 37, 38, 42, 44
See application file for complete search history.

(56) References Cited

U.S. PATENT DOCUMENTS

| | | | | |
|---|---|---|---|---|
| 4,033,222 A | * | 7/1977 | Wilson | F16B 5/02 411/33 |
| 4,143,580 A | * | 3/1979 | Luhm | B23P 9/025 29/524.1 |
| 5,123,792 A | * | 6/1992 | Strobel | F16B 19/1063 411/43 |
| 9,284,971 B2 | * | 3/2016 | Pratt | F16B 19/1063 |

* cited by examiner

*Primary Examiner* — Roberta S Delisle
(74) *Attorney, Agent, or Firm* — Barnes & Thornburg LLP

(57) ABSTRACT

A fastener includes a body having deformable first end, a second end, and a passage extending through the body between the first and second ends. The fastener further includes a corebolt having first and second ends and a region of reduced diameter disposed between the first and second ends and a sleeve having first and second ends, the second end having a bulbing portion. The corebolt is disposed within the sleeve and the body with the first end of the corebolt in engagement with the first end of the sleeve and the first end of the body disposed adjacent the second end of the sleeve. The bulbing portion is adapted to form an enlarged blind head when the corebolt is rotated in relation to the sleeve. The first end of the body is adapted to deform radially inwardly into the region of reduced diameter.

17 Claims, 13 Drawing Sheets

FASTENER AND METHOD OF INSTALLING SAME

CROSS REFERENCE TO RELATED APPLICATIONS

This application is a continuation-in-part of U.S. patent application Ser. No. 13/791,088, filed Mar. 8, 2013, which claims the benefit of U.S. Provisional Patent Application Ser. No. 61/620,296, filed on Apr. 4, 2012, and entitled "Fastener and Method of Installing Same." The disclosures set forth in the referenced applications are incorporated herein by reference in their entireties.

BACKGROUND

1. Field of the Disclosure

The present disclosure relates generally to fasteners for assembly of two or more panels of a workpiece, and more particular to a blind fastener that forms an enlarged blind head spaced from the workpiece surface against which it comes to bear.

2. Description of the Background

Laminated composite materials are prone to crushing and delamination when subjected to extreme compressive stresses, as can occur when fastening. To avoid crushing with conventional fasteners washers and fastener components with enlarged bearing surfaces are employed. The manufactured head of blind fasteners can also be equipped with an enlarged bearing surface but the blind heads of existing blind fasteners do not develop an enlarged blind side bearing surface until after contact with the workpiece surface. Initial contact of a bulbing sleeve with laminated composite materials can, and does, cause localized crushing which can weaken the workpiece.

A need therefore exists for a blind fastener for laminated composites and other fragile construction materials that forms an enlarged blind side bearing surface prior to contacting the workpiece surface.

SUMMARY

According to one aspect of the present disclosure, a fastener includes a body having a deformable first end, a second end, and a passage extending through the body between the first and second ends. The fastener further includes a corebolt having first and second ends and a region of reduced diameter disposed between the first and second ends and a sleeve having first and second ends, the second end having a bulbing portion. The corebolt is disposed within the sleeve and the body with the first end of the corebolt in engagement with the first end of the sleeve and the first end of the body disposed adjacent the second end of the sleeve. The bulbing portion is adapted to form an enlarged blind head when the corebolt is rotated in relation to the sleeve and the first end of the body is adapted to deform inwardly into the region of reduced diameter to allow movement of the blind head along the body.

According to another aspect of the present disclosure, a fastener includes a body having a deformable first end, a second end, and a threaded passage extending at least partially through the body between the first and second ends. The fastener further includes a corebolt having first and second ends, the first end having an enlarged head, and a region of reduced diameter between the first and second ends, and a sleeve having first and second ends, the second end having a bulbing portion. The corebolt is disposed within the sleeve and the body with the corebolt in threaded engagement with the body and the first end of the body disposed adjacent the second end of the sleeve. The bulbing portion is adapted to form an enlarged blind head when the corebolt is rotated in relation to the body and the first end of the body is adapted to deform inwardly into the region of reduced diameter to allow movement of the blind head along the body.

According to yet a further aspect of the present disclosure, a fastener includes a body having deformable first end, a second end, and a passage extending through the body between the first and second ends. The fastener further includes a corebolt having first and second ends and a region of reduced diameter disposed between the first and second ends, a first sleeve having first and second ends, the second end having a bulbing portion, and a second sleeve having first and second ends. The corebolt is disposed within the first sleeve, the second sleeve, and the body with the first end of the corebolt in engagement with the first end of the second sleeve, the second end of the second sleeve disposed adjacent the first end of the first sleeve, and the first end of the body disposed adjacent the second end of the first sleeve. The bulbing portion is adapted to form an enlarged blind head when the corebolt is rotated in relation to the sleeve. The first end of the body is adapted to deform radially inwardly into the region of reduced diameter to allow movement of the blind head along the body.

According to another aspect of the present disclosure, a method of installing a fastener within a workpiece includes the step of providing a fastener having a sleeve disposed adjacent a first end of a corebolt and a body disposed over the corebolt and having a deformable end disposed adjacent an end of the sleeve. The method further includes the steps of placing the fastener into aligned apertures in a workpiece and rotating the corebolt while restraining the body. The method further includes the steps of causing a weakened portion formed in an end of the sleeve to bulb outwardly and deforming the deformable end of the body into a region of reduced diameter in the corebolt. The method still further includes the step of bringing a blind head against a workpiece.

Other aspects and advantages of the present disclosure will become apparent upon consideration of the following drawings and detailed description, wherein similar structures have similar reference numbers.

BRIEF DESCRIPTION OF THE DRAWINGS

The detailed description particularly refers to the accompanying figures in which like reference numerals indicate like features and wherein.

DETAILED DESCRIPTION

Figure 3:
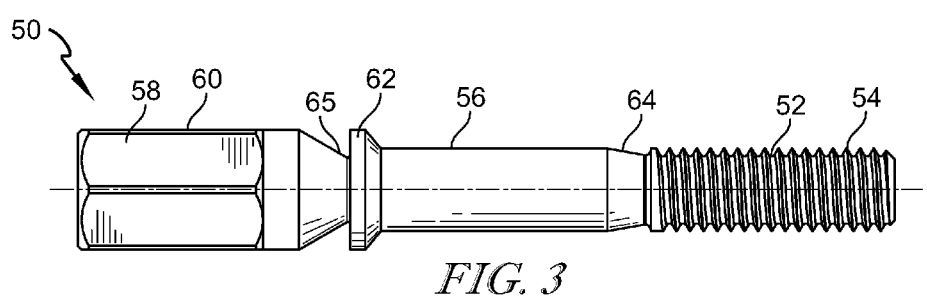
FIG. 3 is a side elevational view of a corebolt of the fastener of FIG. 1.
Figure 4:
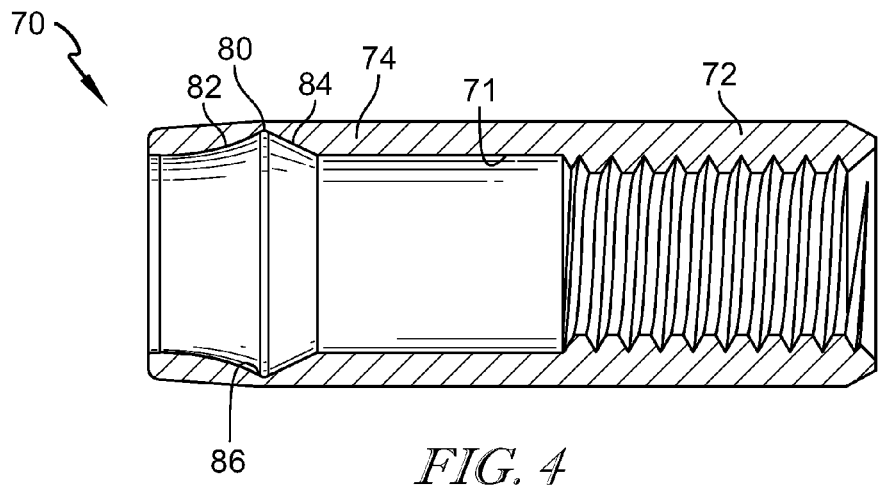
FIG. 4 is a cross-sectional view taken generally along the lines 4-4 of FIG. 1 and depicting a cylindrical sleeve of the fastener.
Figure 5:
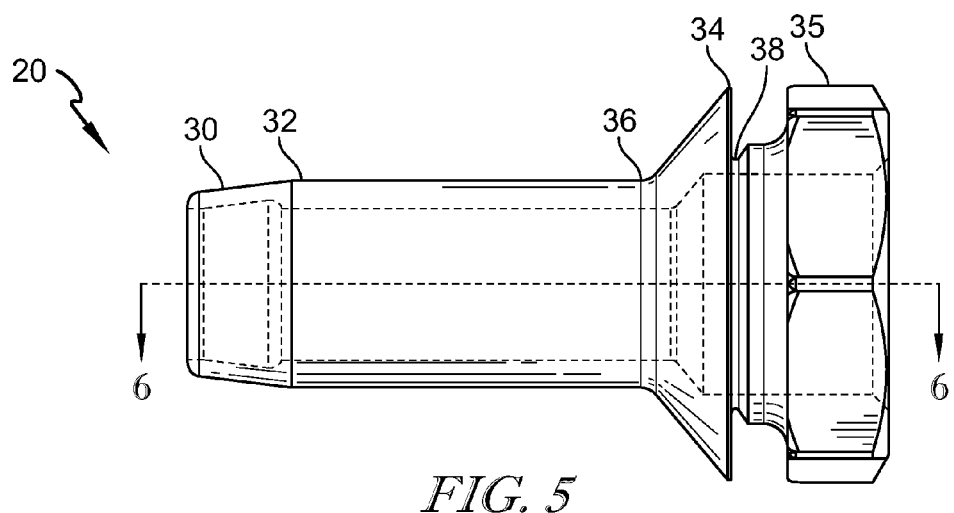
FIG. 5 is a side elevational view of a body of the fastener of FIG. 1.
Figure 6:
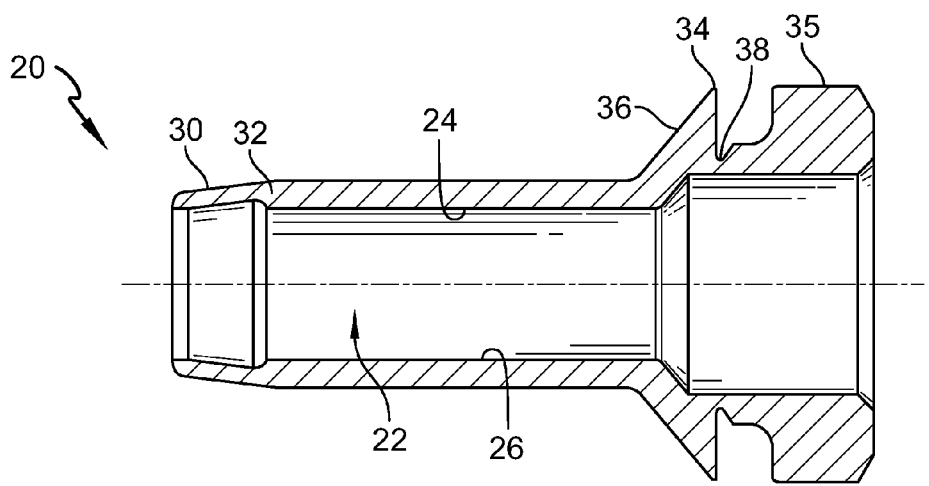
FIG. 6 is a cross-sectional view taken generally along the lines 6-6 of FIG. 5.

Referring to FIGS. 1-7, a first embodiment of a fastener or blind bolt 10 in accordance with the present disclosure includes a generally cylindrical body 20. As best seen in FIGS. 5 and 6, the body 20 includes a passage 22 disposed through a central portion of the body 20. An inner surface 24 of a wall 26 forming the passage 22 is generally smooth. A tapered ramp 30 is disposed at a first end 32 of the body 20 and an enlarged head 34 having a wrenching portion 35 is disposed at a second end 36 of the body 20. A radial groove 38 separates the wrenching portion 35 and the enlarged head 34.

A generally cylindrical corebolt 50, as best seen in FIG. 3, is concentrically disposed within the passage 22 of the body 20. The corebolt 50 includes a threaded portion 52 at a first end 54 of the corebolt 50, a cylindrical shank 56 formed in the center of the corebolt 50, and a frangible wrenching portion 58 disposed at a second end 60 of the corebolt 50. An enlarged head 62 is positioned between the cylindrical shank 56 and the wrenching portion 58, the enlarged head 62 having a diameter greater than a diameter of the cylindrical shank 56. A region of reduced diameter in the form of a radial groove 64 having a diameter smaller than a diameter of the enlarged head 62, the wrenching portion 58, and the cylindrical shank 56 is located between the threaded portion 52 and the cylindrical shank 56, the function of which will be discussed in greater detail hereinafter.

Figure 2:
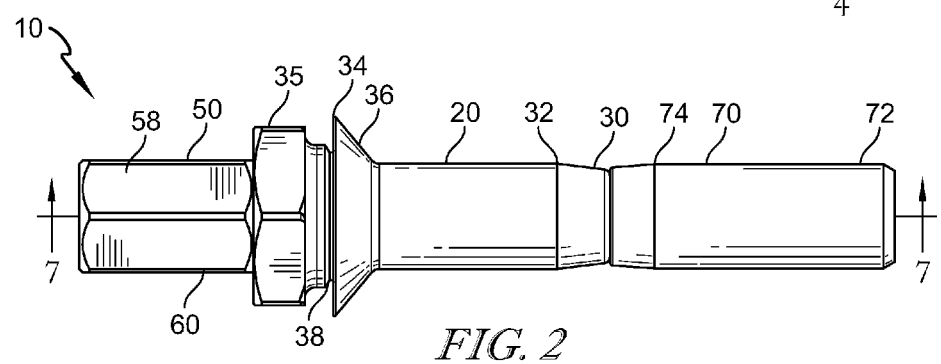
FIG. 2 is a side elevational view of the fastener of FIG. 1.

As seen in FIGS. 2 and 4, a deformable cylindrical sleeve 70 abuts the first end 32 of body 20. The cylindrical sleeve 70 has a first end 72 that is threaded and a second end 74 that is not threaded. The second, non-threaded end 74 may include regions of varying wall thickness, such as tapers, grooves, and the like, to cause a region 80 near the second end 74 to bulb, forming an enlarged blind head, as will be discussed in detail below. As seen in FIG. 4, the region 80 includes tapered walls 82, 84 that create a weakened portion 86. While the weakened portion 86 is shown as a thinned area, the weakened portion 86 may be weakened in any fashion that would allow for bulbing of the sleeve at region 80, for example, a radial groove, one or more indentations, a thinner, flexible material, localized annealing or heat treatment, and the like.

The cylindrical sleeve 70 preferably has a diameter that creates a clearance fit with an aperture 100 in a workpiece 102 (FIGS. 8 and 9) so as to avoid damage to blind side plies 104 of laminated composite workpiece 102 during insertion of the fastener 10 into the workpiece. Similarly, the body 20 may create a clearance fit or a slight interference fit with the aperture 100 in the workpiece 102, depending on the specific application and workpiece materials.

Figure 1:
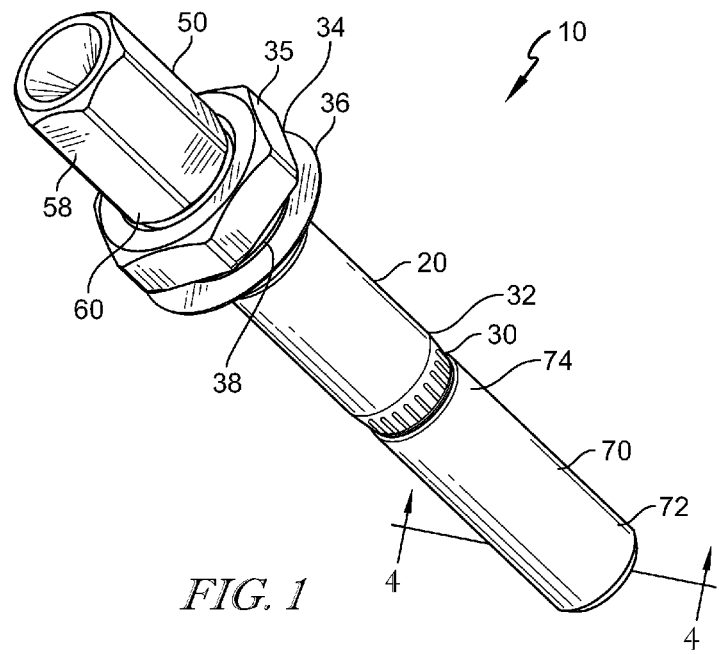
FIG. 1 shows a top isometric view of a first embodiment of a fastener.
Figure 7:
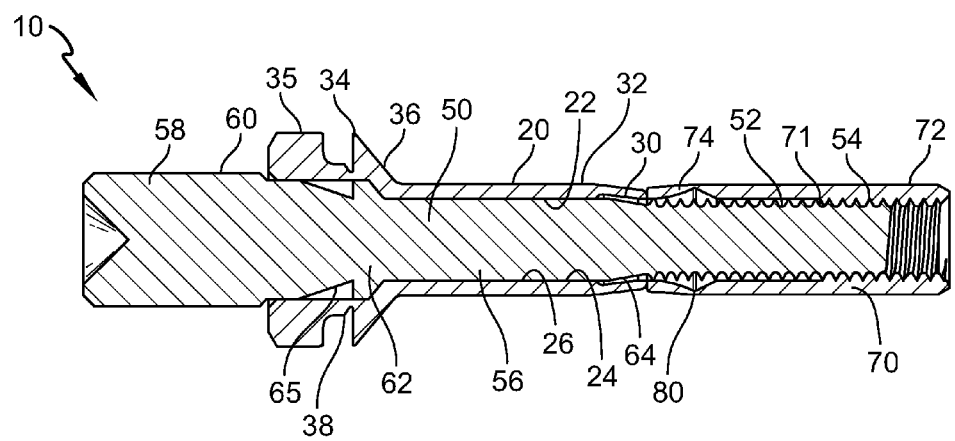
FIG. 7 is a cross-sectional view taken generally along the lines 7-7 of FIG. 2.

Referring to FIGS. 1, 2, and 7, when assembled, the threaded first end 72 of the cylindrical sleeve 70 is disposed over the first end 54 of the corebolt 50 such that the first end 72 is in threaded engagement with the threaded portion 52 of the corebolt 50. The body 20 is also disposed over at least a central portion of the corebolt 50 with the enlarged head 62 of the corebolt 50 disposed within the enlarged head 34 of the body 20, preventing inward movement of the corebolt 50 within the body 20. A second end 74 of the cylindrical sleeve 70 is also compressed tightly against the first end 32 of body 20 so as to rotationally restrain the cylindrical sleeve 70 during the initial stages of installation. Knurls, friction enhancing coatings, or interlocking surfaces may be used to produce this rotational restraint.

Figure 8:
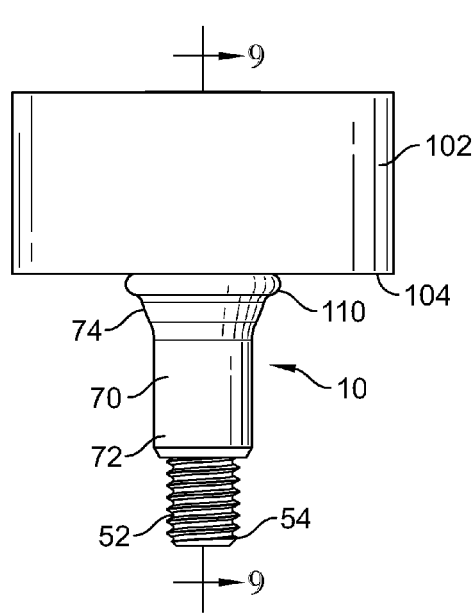
FIG. 8 is a side elevational view of the fastener of FIG. 1 installed within a workpiece.
Figure 9:
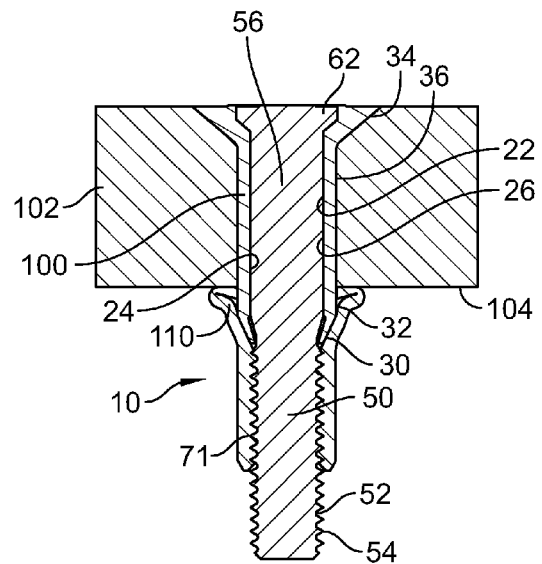
FIG. 9 is a cross-sectional view taken generally along the lines 9-9 of FIG. 8.
Figure 10:
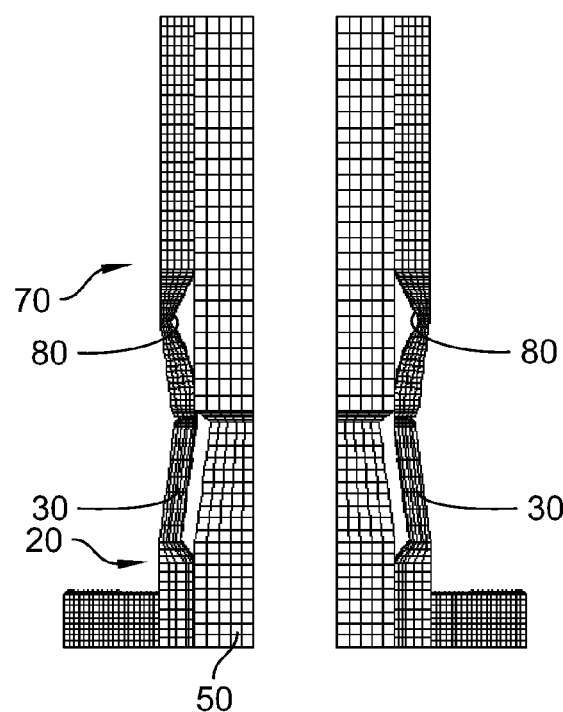
FIGS. 10-14 depict various stages of a sequence of forming a blind head as predicted by computer simulation.
Figure 11:
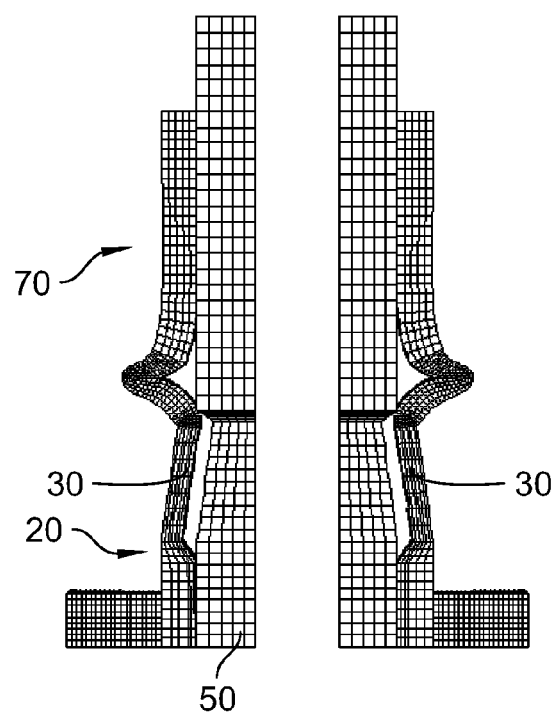
Figure 12:
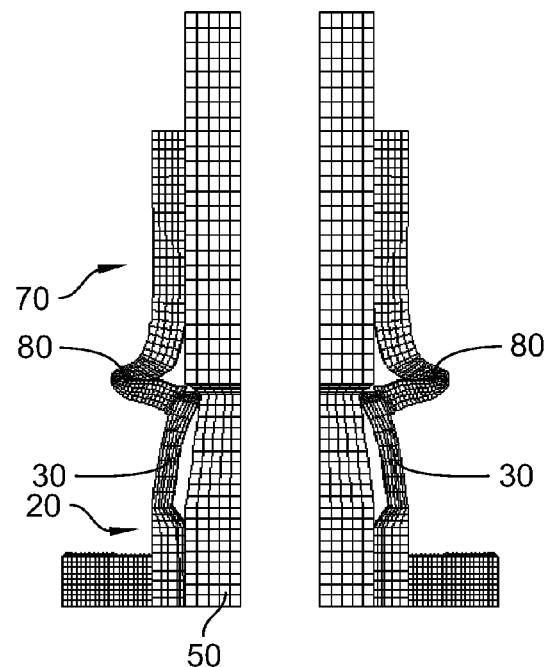
Figure 13:
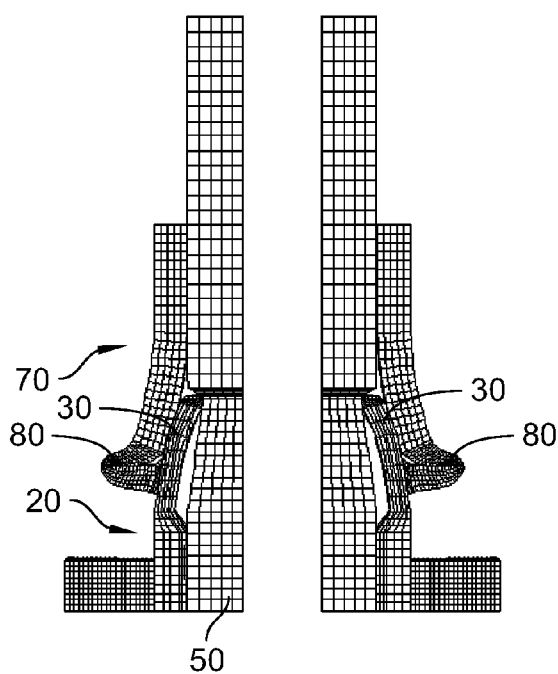
Figure 14:
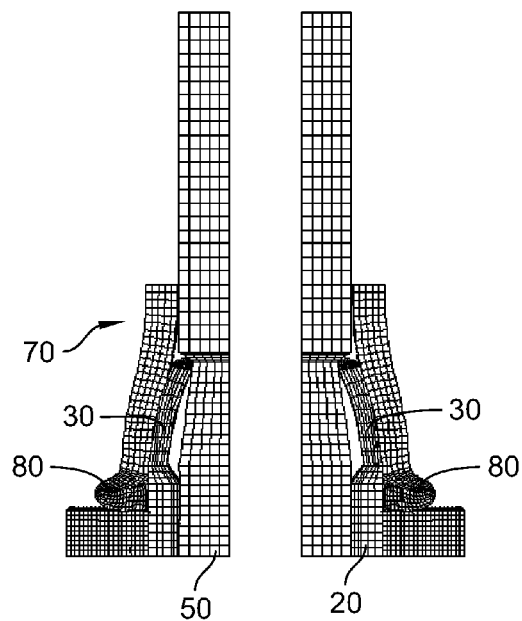

FIGS. 8 and 9 depict the fastener 10 of FIGS. 1, 2, and 7 as the fastener 10 is installed within the workpiece 102. The fastener 10 may be installed using any installation tool known in the art. The workpiece 102 is comprised of two or more sheets, or panels, of material, or two or more structural elements. Before installation of the fastener 10 into the workpiece 102, the fastener is inserted into aligned apertures 100 of the elements of the workpiece 102 until the enlarged head 34 of the body 20 is seated against the workpiece 102. An installation tool is then used, which engages the wrenching portion 35 of the body 20 and the wrenching portion 58 of the corebolt 50. In doing so, the body 20 is rotationally restrained as the corebolt 50 is rotated. Rotation of the corebolt 50 causes the corebolt 50 to thread into the cylindrical sleeve 70, thereby compressing the region 80 of the cylindrical sleeve 70 against the first end 32 of the body 20 (see FIG. 10). In particular, the tapered walls 82, 84 move outwardly and toward one another at weakened portion 86. This compression causes the region 80 of the cylindrical sleeve 70 to bulb outwardly (see FIG. 11), forming an enlarged blind head 110. After the region 80 has bulbed, the second end of the cylindrical sleeve 70 moves onto the tapered ramp 30 of the body 20 (see FIG. 12), causing the tapered ramp 30 to deform inwardly into the radial groove 64 of the corebolt 50. This deformation of the tapered ramp 30 removes the obstruction formed by the first end 32 of the body 20 that previously restricted axial movement of the cylindrical sleeve 70 so that the cylindrical sleeve 70 can now travel along the tapered ramp 30 (see FIG. 13) and an outer surface 120 of the body 20 until the enlarged blind head 110 comes to bear against the workpiece 102 (see FIGS. 9 and 14).

Figure 21:
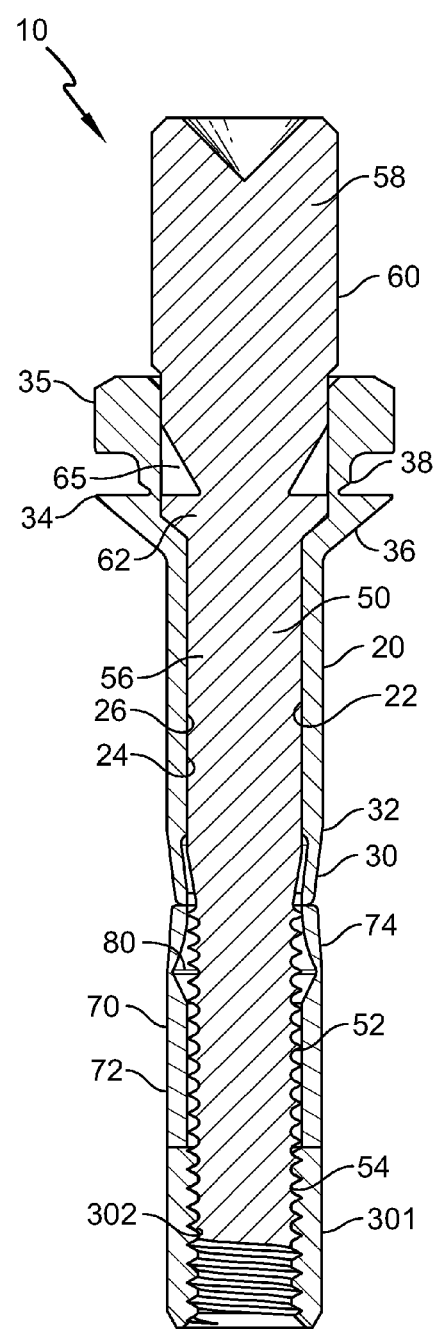
FIG. 21 is a cross-sectional view taken generally along the lines 21-21 of FIG. 20.
Figure 22:
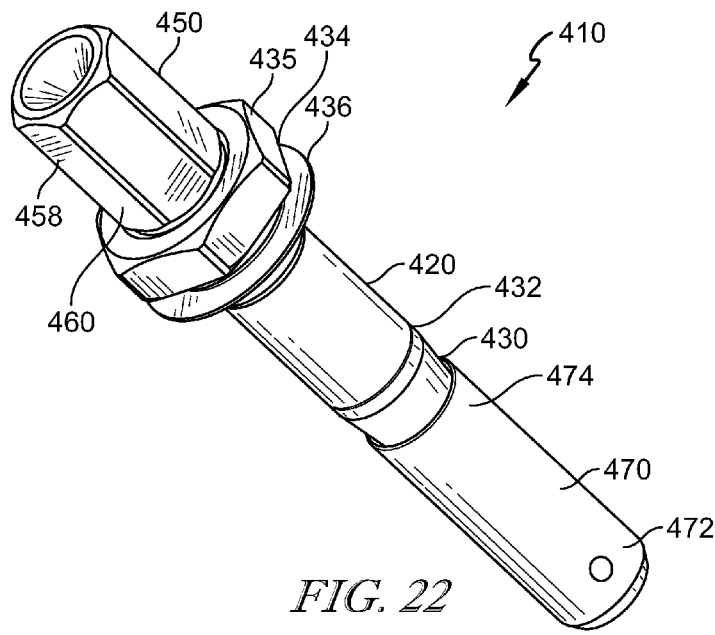
FIG. 22 shows a top isometric view of a fourth embodiment of a fastener.
Figure 23:
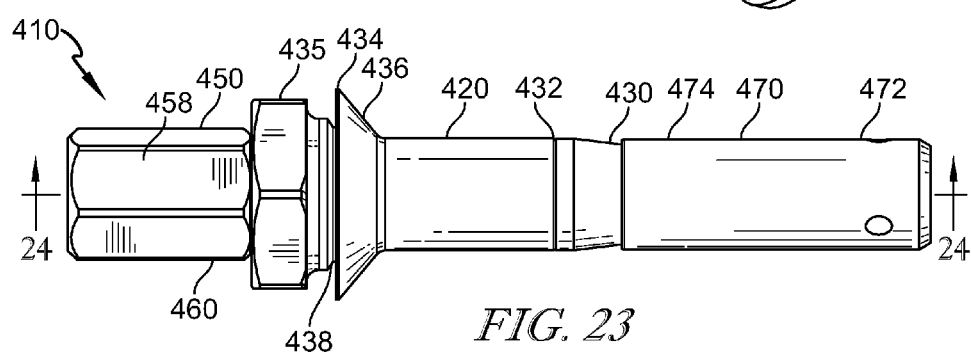
FIG. 23 is a side elevational view of the fastener of FIG. 22.

As enlarged blind head 110 compresses against workpiece surface 102, the torque required to continue rotating corebolt 50 increases until the wrenching portion 58 of the corebolt 50 separates at the enlarged head 62 as suggested in FIG. 9, terminating the installation phase. For example, as shown in FIG. 21, the corebolt 50 is formed to include a radial groove 65 between the wrenching portion 58 and the enlarged head 62 to facilitate separation of the wrenching portion 58. The wrenching portion 35 of the body 20 is then twisted off and broken at the radial groove 38 to produce a recess-free and substantially flush surface against the enlarged head 34 of the body 20. Optionally, the enlarged head 34 of the body 20 may be provided with recesses, as are known in the art to rotationally restrain the body 20 during installation.

While the first end 32 of the body 20 is shown as having a tapered ramp 30 and the corebolt 50 is shown as having a radial groove 64 in the embodiment of FIGS. 1-7, any other feature or features that allow for deformation of the first end of the body 20 may be utilized in place of the tapered ramp 30 and/or radial groove 64. For example, the radial groove 64 may be replaced by an area of reduced diameter, as will be discussed in greater detail hereinafter.

Figure 15:
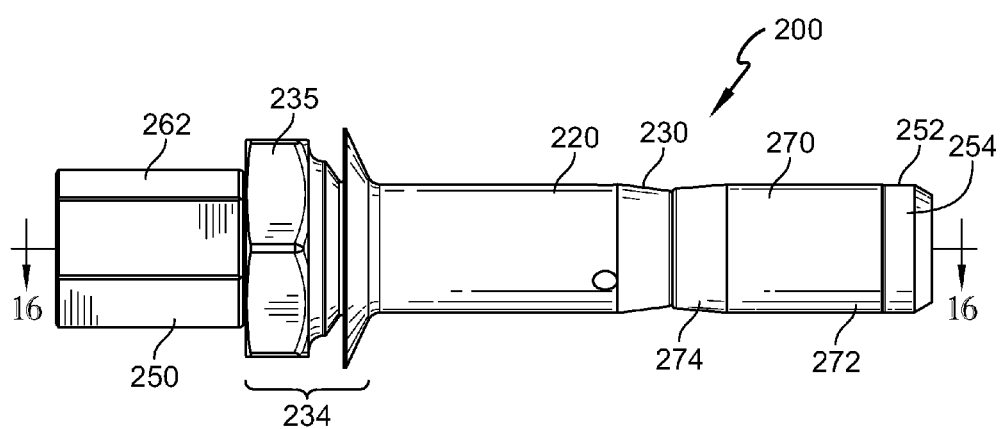
FIG. 15 is a side elevational view of a second embodiment of a fastener.
Figure 16:
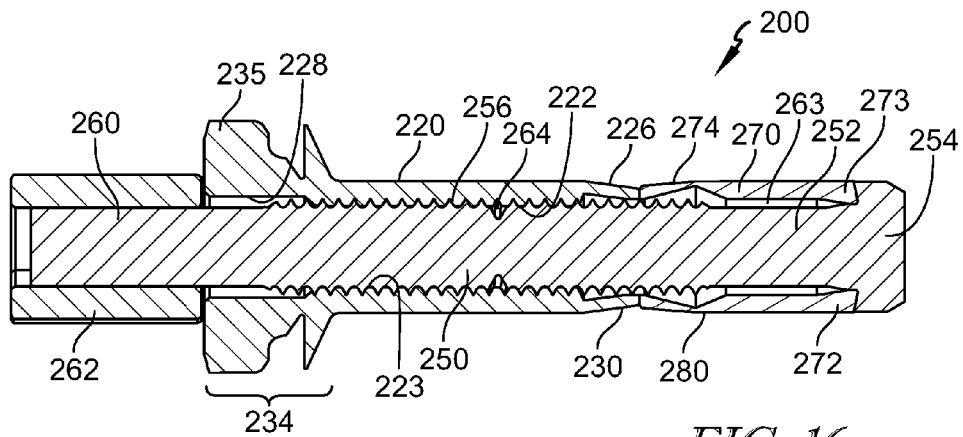
FIG. 16 is a cross-sectional view taken generally along the lines 16-16 of FIG. 15.

An alternative embodiment of a fastener 200 is illustrated in FIGS. 15 and 16. The fastener 200 includes a generally cylindrical body 220 having a passage 222 disposed through a central portion of the body 220. A central portion 223 of a wall 224 forming the passage 222 is threaded. A tapered ramp 230 is disposed at the first end 226 of the body 20 and an enlarged head 234 having a wrenching portion 235 is disposed at the second end 228 of the body 20.

A generally cylindrical corebolt 250 is concentrically disposed within the passage 222 of the body 220. The corebolt 250 includes a first end 252 having an enlarged retaining member 254, a central threaded portion 256 that engages the central threaded portion 223 of the body 220, and a second end 260 that extends out of the body 220 and includes wrenching means 262. The wrenching means 262 may be a separate piece attached by press fit, with adhesives, or by staking to the second end 260 of the corebolt 250 or may be integral with the corebolt 250. The corebolt 250 also includes a region of reduced diameter in the form of an unthreaded region 263 that allows for deformation of the tapered ramp 230, as will be discussed in greater detail below. The unthreaded region 263 has a diameter less than a major diameter of the threaded portion 223. A radial notch or groove 264 is also disposed in the threaded portion 256 of the corebolt 250, as will be discussed in greater detail below.

Still referring to FIGS. 15 and 16, a deformable cylindrical sleeve 270 abuts the first end 226 of body 220. The cylindrical sleeve 270 has a first end 272 that rests against a ledge 273 formed by the enlarged head 254 of the corebolt 250 and a second end 274 that may include regions of varying wall thickness, such as tapers, grooves, and the like, to cause a region 280 near the second end 274 to bulb, forming an enlarged blind head, as will be discussed in detail below. The region 280 is similar to the region 80 shown in FIG. 4.

The cylindrical sleeve 270 preferably has a diameter that creates a clearance fit with an aperture 100 in a workpiece 102 (see FIGS. 17-19) so as to avoid damage to blind side plies 104 of a laminated composite workpiece 102 during insertion of the fastener 200 into the workpiece 102. Similarly, a diameter of the cylindrical body 220 may create a clearance fit or a slight interference fit with the aperture 100 in the workpiece 102, depending on the specific application and workpiece materials.

When the fastener 200 is assembled, the central threaded portion 223 of the body 220 threadedly engages the central threaded portion 256 of the corebolt 250 and the cylindrical sleeve 270 is disposed between the first end 226 of the body 220 and the enlarged head 254 of the corebolt 250.

Figure 17:
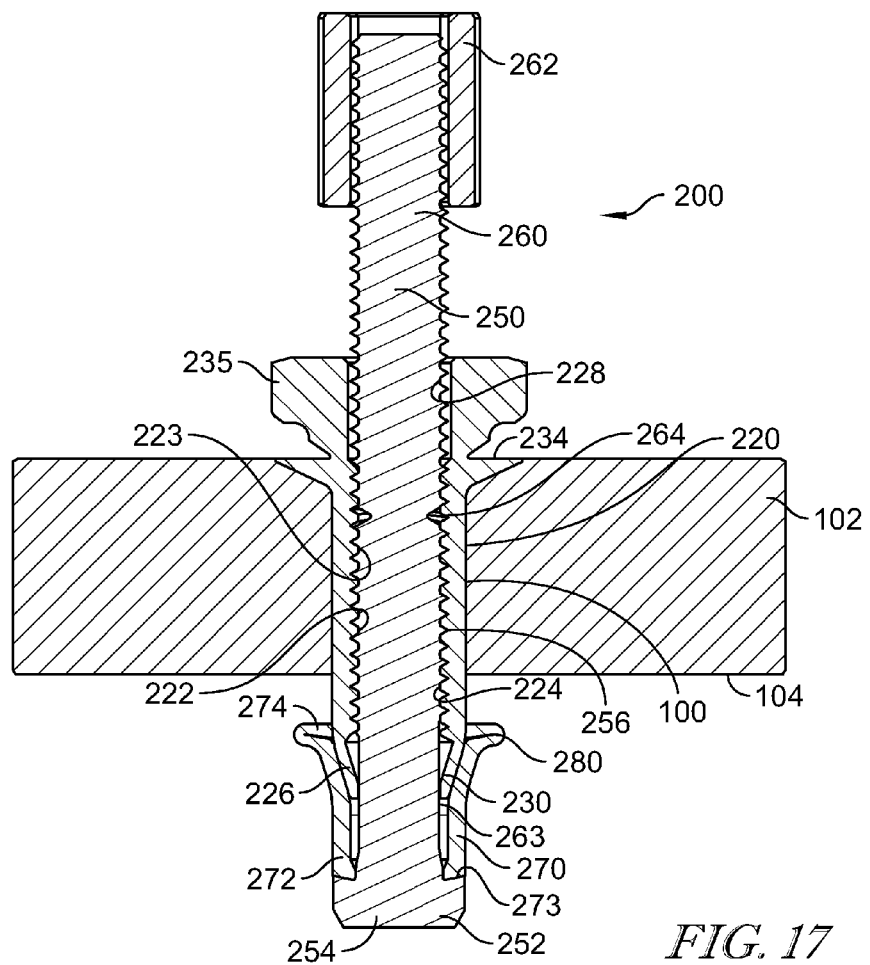
FIG. 17 is a cross-sectional view showing the fastener of FIG. 15 during a phase of installation in minimum grip in which the blind head has been formed but not yet moved into contact with the workpiece.
Figure 18:
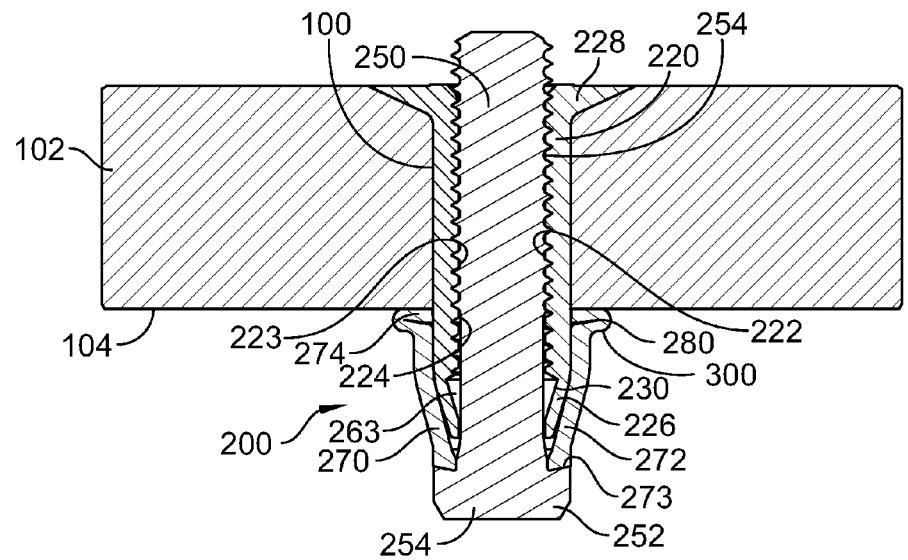
FIG. 18 is a cross-sectional view similar to FIG. 17 and showing the fastener of FIG. 15 in a minimum grip condition upon completion of installation.
Figure 19:
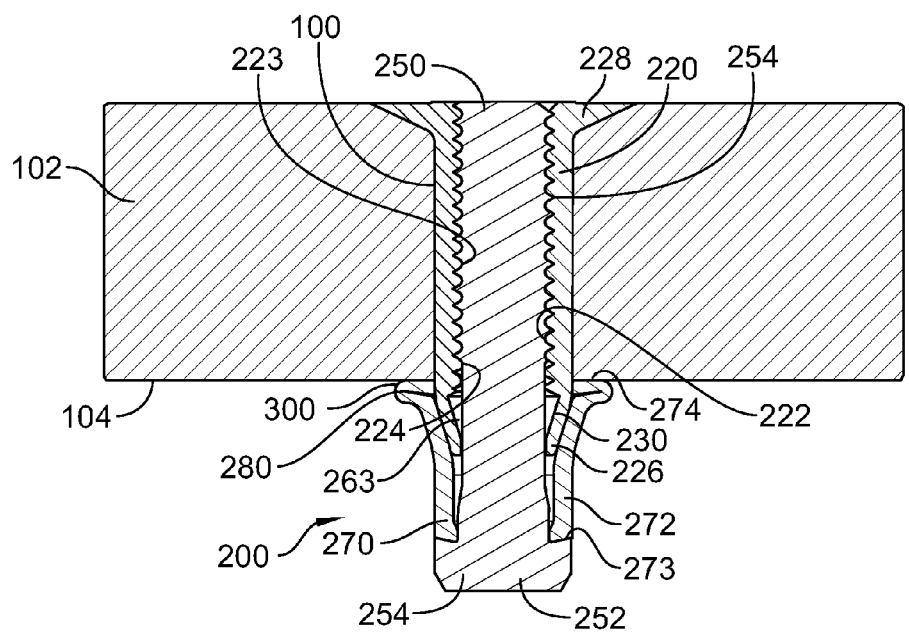
FIG. 19 is a cross-sectional view similar to FIG. 17 and showing the fastener of FIG. 15 in a maximum grip condition upon completion of installation.

FIG. 17 depicts the fastener 200 as it is being installed within the workpiece 102 and FIGS. 18 and 19 depict the fastener 200 in minimum and maximum grip conditions, respectively. During installation, as the corebolt 250 is threaded into the body 220, the retaining member 254 of the corebolt 250 pushes the cylindrical sleeve 270 toward the body 220, compressing the cylindrical sleeve 270 against the first end 226 of the body 220, causing the cylindrical sleeve 270 to bulb at region 280, as seen in FIGS. 18 and 19. As threading of the corebolt 250 into the body 220 continues, the tapered ramp 230 of the body 220 deforms inwardly into the unthreaded region 263 of the corebolt 250 due to pressure exerted by the cylindrical sleeve 270 on the body 220, allowing the cylindrical sleeve 270 to advance toward the workpiece 102, forming a blind head 300. Upon clamping of the workpiece 102 by the cylindrical sleeve 270, an increase in applied torque causes the wrenching means 262 of the corebolt 250 to sever from the rest of the corebolt 250 at the groove 264. The optional wrenching means 235 on the enlarged head 234 may then be removed from the body 220 by twisting. Depending on the thickness of the workpiece 102, the fastener 220 may be installed in a minimum grip condition, as seen in FIG. 18, or a maximum grip condition, as seen in FIG. 19.

Figure 20:
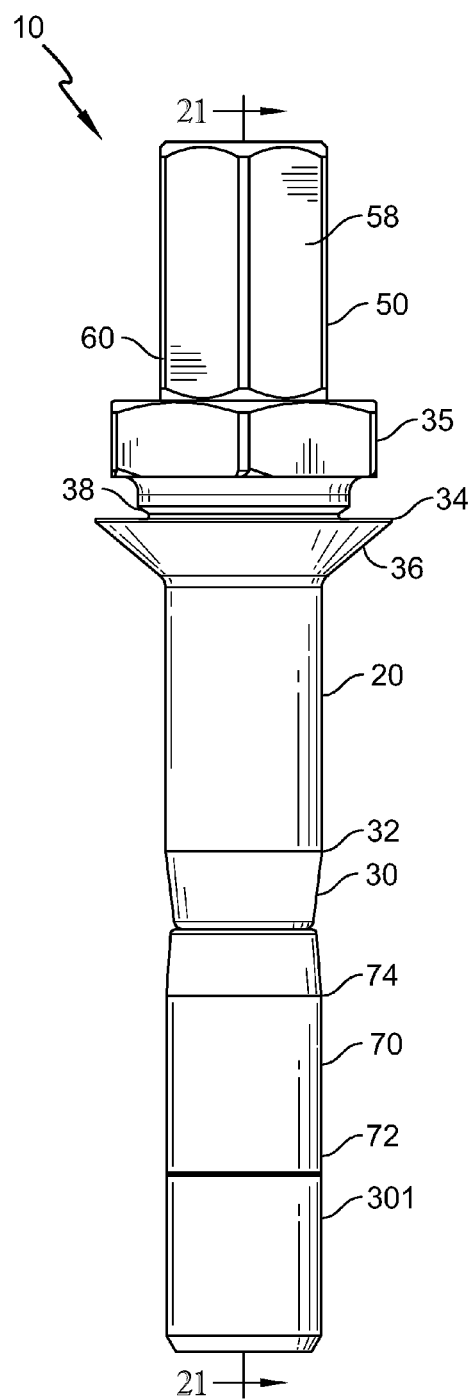
FIG. 20 is a side elevational view of a third embodiment of a fastener.

A variation of the fastener 10 of FIGS. 1-7 is depicted in FIGS. 20 and 21. The fastener 10 of FIGS. 20 and 21 is similar to the fastener 10 of FIGS. 1-7 and, thus, similar reference numbers will be utilized and only the differences will be described. In particular, the fastener 10 of FIGS. 20 and 21 includes a shortened sleeve 70 with features similar to that described in relation to the sleeve 70 of FIGS. 1-7, except that the passage 71 is unthreaded. A second sleeve 301 is disposed adjacent the first end 72 of the sleeve 70 and includes an inner threaded passage 302 in threaded engagement with the first end 54 of the corebolt 50. The fastener 10 having two sleeves 70, 301 functions in the same manner as described with respect to FIGS. 8-14.

Figure 24:
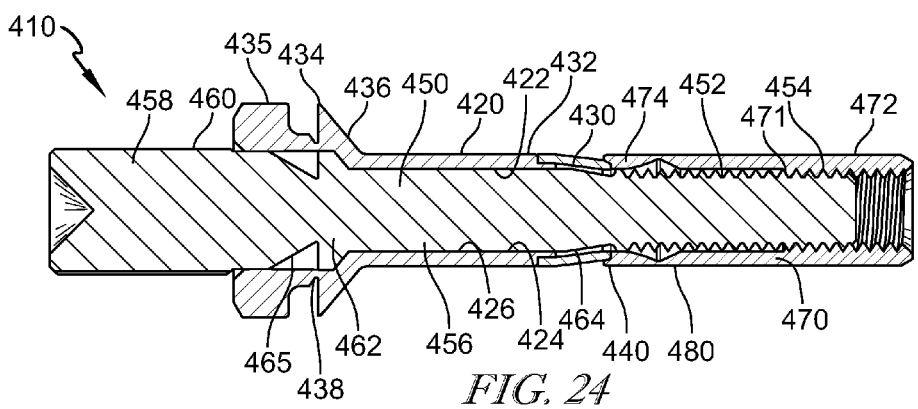
FIG. 24 is a cross-sectional view taken generally along the lines 24-24 of FIG. 23.
Figure 25:
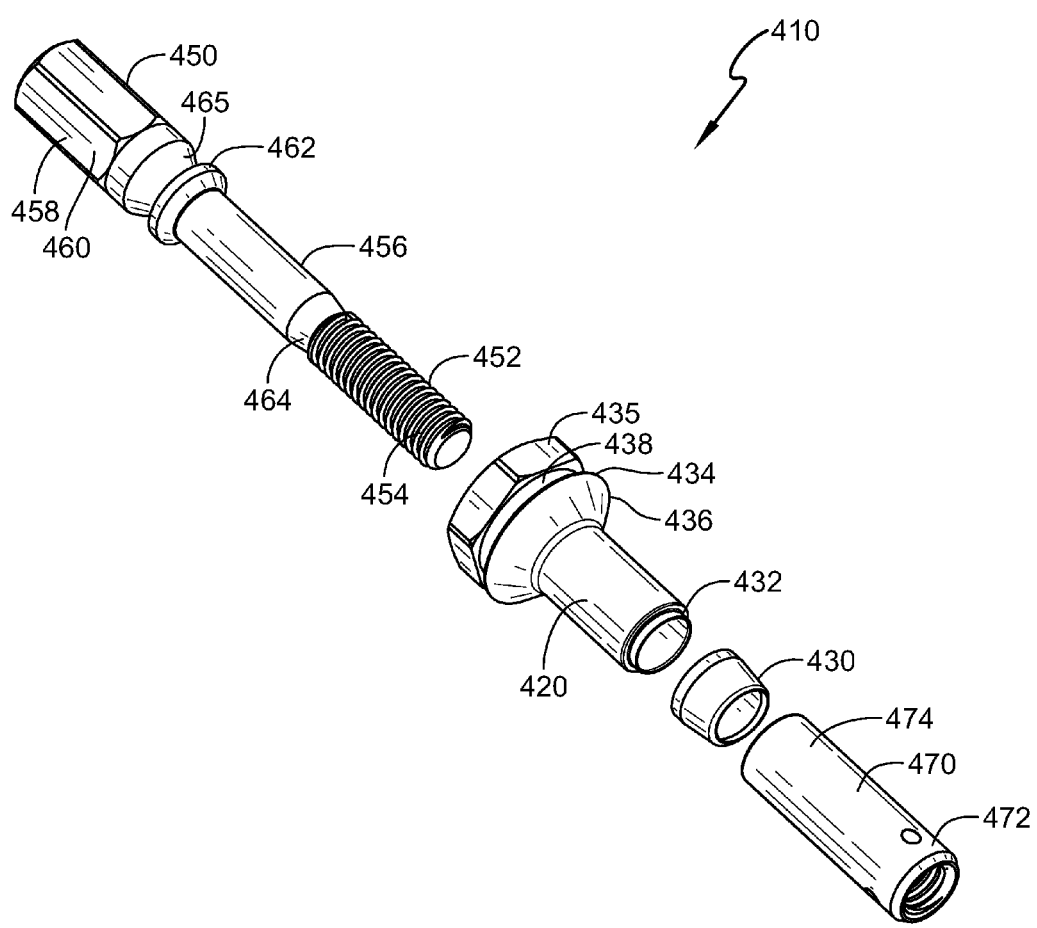
FIG. 25 is an exploded perspective assembly view of the fastener of FIG. 22.

Referring to FIGS. 22-25, another embodiment of a fastener or blind bolt 410 in accordance with the present disclosure includes a generally cylindrical body 420 and a generally cylindrical corebolt 450 concentrically disposed within a passage 422 of the body 420. As best seen in FIG. 24, the body 420 includes the passage 422 disposed through a central portion of the body 420. An inner surface 424 of a wall 426 forming the passage 422 is generally smooth. A tapered ramp 430 is disposed at a first end 432 of the body 420 and an enlarged head 434 having a wrenching portion 435 is disposed at a second end 436 of the body 420. A radial groove 438 separates the wrenching portion 435 and the enlarged head 434. Tapered ramp 430 is separate from body 420 as shown in FIG. 25. The separate tapered ramp 430 disposed at the first end 432 of the body 420 may be formed from the same or a different material as the body 420. The tapered ramp 430 may be formed by machining, forging, stamping, or wrapping a shaped wire around a mandrel with or without the ends secured together, for example.

The corebolt 450, as best seen in FIGS. 24 and 25, includes a threaded portion 452 at a first end 454 of the corebolt 450, a cylindrical shank 456 formed in the center of the corebolt 450, and a frangible wrenching portion 458 disposed at a second end 460 of the corebolt 450. An enlarged head 462 is positioned between the cylindrical shank 456 and the wrenching portion 458, the enlarged head 462 having a diameter greater than a diameter of the cylindrical shank 456. The corebolt 450 is formed to include a radial groove 465 between the wrenching portion 458 and the enlarged head 462 to facilitate separation of the wrenching portion 458. A region of reduced diameter in the form of a radial groove 464 having a diameter smaller than a diameter of the enlarged head 462, the wrenching portion 458, and the cylindrical shank 56 is located between the threaded portion 452 and the cylindrical shank 456, the function of which will be discussed in greater detail hereinafter.

As seen in FIG. 24, a deformable cylindrical sleeve 470 abuts the tapered ramp 430 disposed at the first end 432 of body 420. A frictional interface, such as knurls or a press fit, may be used to rotationally restrain tapered ramp 430 with body 420. The cylindrical sleeve 470 has a first end 472 that is threaded and a second end 474 that is not threaded. The second, non-threaded end 474 may include regions of varying wall thickness, such as tapers, grooves, and the like, to cause a region 480 near the second end 474 to bulb, forming an enlarged blind head, similar to sleeve 70 shown in FIGS. 1-14.

Referring to FIGS. 24 and 25, when assembled, the threaded first end 472 of the cylindrical sleeve 470 is disposed over the first end 454 of the corebolt 450 such that the first end 472 is in threaded engagement with the threaded portion 452 of the corebolt 450. The body 420 is also disposed over at least a central portion of the corebolt 450 with the enlarged head 462 of the corebolt 450 disposed within the enlarged head 434 of the body 420, preventing inward movement of the corebolt 450 within the body 420. A second end 474 of the cylindrical sleeve 470 is also compressed tightly against the tapered ramp 430 disposed at the first end 432 of body 420 so as to rotationally restrain the cylindrical sleeve 470 during the initial stages of installation. Knurls, friction enhancing coatings, or interlocking surfaces may be used to produce this rotational restraint. A lip 440 may be disposed at the second end 474 of the sleeve 470. The lip 440 surrounds an end portion of the tapered ramp 430 to maintain the sleeve 470 in concentric alignment with the tapered ramp 430 during the bulbing phase of installation.

The fastener 410 is configured to be installed through a workpiece, such as the workpiece 102 shown in FIGS. 8 and 9. The fastener 410 may be installed using any installation tool known in the art. After insertion, an installation tool is then used, and the fastener 410 forms a blind head to engage the workpiece 102 similar to the fastener 10 shown in FIGS. 1-14. As enlarged blind head formed by the fastener 410 compresses against the workpiece surface, the torque required to continue rotating corebolt 450 increases until the wrenching portion 458 of the corebolt 450 separates at the enlarged head 462, terminating the installation phase. The wrenching portion 435 of the body 420 is then twisted off and broken at the radial groove 438 to produce a recess-free and substantially flush surface against the enlarged head 434 of the body 420. Optionally, the enlarged head 434 of the body 420 may be provided with recesses, as are known in the art to rotationally restrain the body 420 during installation.

Figure 26:
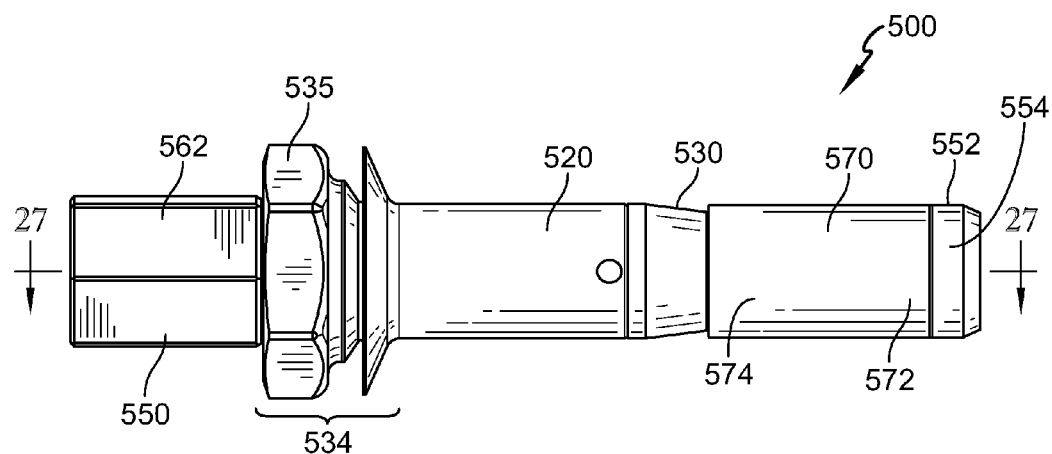
FIG. 26 shows a side elevation view of a fifth embodiment of a fastener.
Figure 27:
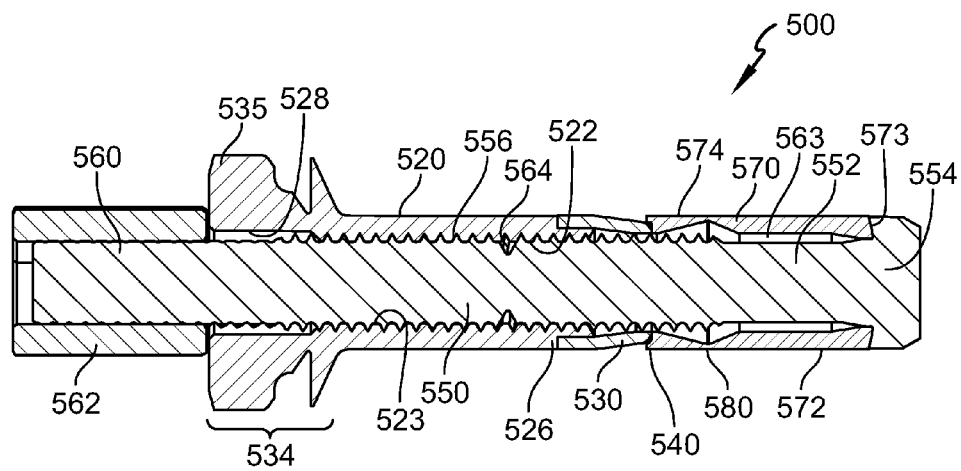
FIG. 27 is a cross-sectional view taken generally along the lines 27-27 of FIG. 26.
Figure 28:
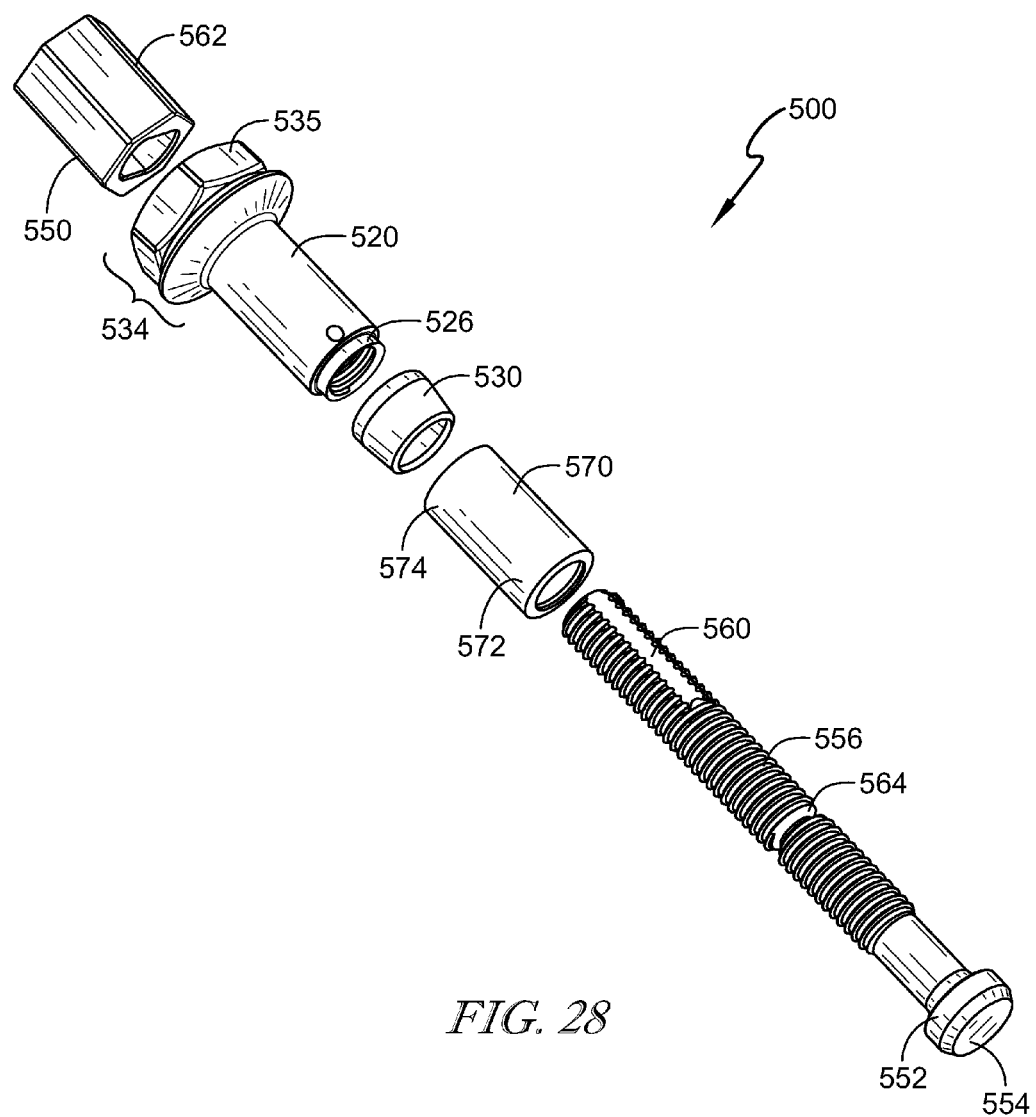
FIG. 28 is an exploded perspective assembly view of the fastener of FIG. 26.

An alternative embodiment of a fastener 500 is illustrated in FIGS. 26-28. The fastener 500 includes a generally cylindrical body 520 having a passage 522 disposed through a central portion of the body 520. A central portion 523 of a wall 524 forming the passage 522 is threaded. A tapered ramp 530 is disposed at the first end 526 of the body 520 and an enlarged head 534 having a wrenching portion 535 is disposed at the second end 528 of the body 520. A frictional interface, such as knurls or a press fit, may be used to rotationally restrain tapered ramp 530 with body 520. Tapered ramp 530 is separate from body 520 as shown in FIG. 28. The separate tapered ramp 530 disposed at the first end 526 of the body 520 may be formed from the same or a different material as the body 520. The tapered ramp 530 may be formed by machining, forging, stamping, or wrapping a shaped wire around a mandrel with or without the ends secured together, for example.

A generally cylindrical corebolt 550 is concentrically disposed within the passage 522 of the body 520. The corebolt 550 includes a first end 552 having an enlarged head 554, a central threaded portion 556 that engages the central threaded portion 523 of the body 520, and a second end 560 that extends out of the body 520 and includes wrenching means 562. The wrenching means 562 may be a separate piece attached by press fit, with adhesives, or by staking to the second end 560 of the corebolt 550 or may be integral with the corebolt 550. The corebolt 550 also includes a region of reduced diameter in the form of an unthreaded region 563 that allows for deformation of the tapered ramp 530, as will be discussed in greater detail below. The unthreaded region 563 has a diameter less than a major diameter of the threaded portion 523. A radial notch or groove 564 is also disposed in the threaded portion 556 of the corebolt 550, as will be discussed in greater detail below.

Still referring to FIGS. 26-28, a deformable cylindrical sleeve 570 abuts an end of tapered ramp 530. The cylindrical sleeve 570 has a first end 572 that rests against a ledge 573 formed by the enlarged head 554 of the corebolt 550 and a second end 574 that may include regions of varying wall thickness, such as tapers, grooves, and the like, to cause a region 580 near the second end 574 to bulb, forming an enlarged blind head, as will be discussed in detail below. The region 580 is similar to the region 280 shown in FIG. 16. A lip 540 may be disposed at the second end 574 of the sleeve 570. The lip 540 surrounds an end portion of the tapered ramp 530 to maintain the sleeve 570 in concentric alignment with the tapered ramp 530 during the bulbing phase of installation.

The cylindrical sleeve 570 preferably has a diameter that creates a clearance fit with an aperture 100 in a workpiece 102 (see FIGS. 17-19) so as to avoid damage to blind side plies 104 of a laminated composite workpiece 102 during insertion of the fastener 500 into the workpiece 102. Similarly, a diameter of the cylindrical body 520 may create a clearance fit or a slight interference fit with the aperture 100 in the workpiece 102, depending on the specific application and workpiece materials. The fastener 500 is installed similar to fastener 200 shown in FIGS. 15-19 and described above.

When the fastener 500 is assembled, the central threaded portion 523 of the body 520 threadedly engages the central threaded portion 556 of the corebolt 550 and the cylindrical sleeve 570 is disposed between ramp 530 and the enlarged head 554 of the corebolt 550.

Any of the embodiments described herein may be modified to include any of the structures or methodologies disclosed in connection with other embodiments.

Further, although directional terminology, such as front, back, upper, lower, etc. may be used throughout the present specification, it should be understood that such terms are not limiting and are only utilized herein to convey the orientation of different elements with respect to one another.

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A fastener comprising:
   a body having a first end, a second end, and a passage extending through the body between the first and second ends;
   a corebolt having first and second ends and a region of reduced diameter disposed between the first and second ends;
   a sleeve having first and second ends, the second end having a bulbing portion; and
   a tapered ramp disposed at the first end of the body, the tapered ramp separate from the body and in abutment with the first end of the body to block axially movement of the tapered ramp toward the body;
   wherein the corebolt is disposed within the sleeve and the body with the first end of the corebolt in engagement with the first end of the sleeve and the tapered ramp disposed adjacent the second end of the sleeve; and
   wherein the bulbing portion is adapted to form an enlarged blind head when the corebolt is rotated in relation to the sleeve;
   wherein the tapered ramp is adapted to deform radially inwardly into the region of reduced diameter to allow movement of the blind head along the body.

2. The fastener of claim 1, wherein the second end of the sleeve is formed to include a lip configured to surround an end portion of the tapered ramp to align the sleeve with the tapered ramp.

3. The fastener of claim 1, wherein the bulbing portion is formed by:
   a first tapered wall that tapers inwardly from the second end of the sleeve toward first end of the sleeve; and
   a second tapered wall that tapers outwardly from an end of the first tapered wall toward the first end of the sleeve;
   wherein the first and second tapered walls form a weakened portion.

4. The fastener of claim 1, wherein the bulbing portion is formed by a weakened portion selected from the group consisting of: one or more radial grooves, one or more indentations, localized annealing, a heat treatment, an absence of threading, and a thin, flexible material.

5. The fastener of claim 1, wherein at least a portion of the first end of the corebolt is threaded and the sleeve includes an inner surface that is threaded along a length thereof and wherein the threading of the sleeve engages the threading of the corebolt.

6. The fastener of claim 1, wherein the corebolt includes an enlarged head at the first end thereof and the first end of the sleeve abuts the enlarged head such that, as the corebolt is threaded into the body, the enlarged head pushes the sleeve toward the body, thereby causing the sleeve to bulb at the bulbing portion.

7. A fastener comprising:
   a body having a first end, a second end, and a threaded passage extending at least partially through the body between the first and second ends;
   a corebolt having first and second ends, the first end having an enlarged head and a region of reduced diameter between the first and second ends;
   a sleeve having first and second ends, the second end having a bulbing portion; and
   a tapered ramp disposed at the first end of the body, the tapered ramp separate from the body and in abutment with the first end of the body to block axially movement of the tapered ramp toward the body;
   wherein the corebolt is disposed within the sleeve and the body with the corebolt in threaded engagement with the body and the tapered ramp disposed adjacent the second end of the sleeve;
   wherein the bulbing portion is adapted to form an enlarged blind head when the corebolt is rotated in relation to the body and the tapered ramp is adapted to deform radially inwardly into the region of reduced diameter to allow movement of the blind head along the body.

8. The fastener of claim 7, therein the second end of the sleeve is formed to include a lip configured to surround an end portion of the tapered ramp to align the sleeve with the tapered ramp.

9. The fastener of claim 7, wherein the bulbing portion is formed by:
   a first tapered wall that tapers inwardly from the second end of the sleeve toward first end of the sleeve; and
   a second tapered wall that tapers outwardly from an end of the first tapered wall toward the first end of the sleeve;
   wherein the first and second tapered walls form a weakened portion.

10. The fastener of claim 7, wherein the first end of the sleeve is disposed adjacent the enlarged head of the corebolt and wherein the enlarged head is adapted to push the sleeve toward the body when the corebolt is threaded into the body, thereby causing the sleeve to bulb at the bulbing portion.

11. The fastener of claim 7, wherein the bulbing portion is formed by a weakened portion selected from the group consisting of: one or more radial grooves, one or more indentations, localized annealing, a heat treatment, an absence of threading, and a thin, flexible material.

12. A fastener comprising:
   a body having a first end and an enlarged head positioned at a second end of the body and spaced apart from the first end, the body configured to include a first bolt-receiving passage extending through the body between the first and second ends;
   a sleeve having a first wall section, a second wall section coupled to the first wall section, a third wall section coupled to the second wall section opposite of the first wall section, and a second bolt-receiving passage extending through the sleeve;
   a corebolt positioned to lie in the first bolt-receiving passage of the body and the second bolt-receiving passage of the sleeve; and
   a tapered ramp disposed at the first end of the body, the tapered ramp separate from the body and in abutment with the first end of the body to block axially movement of the tapered ramp toward the body;
   wherein the second wall section of the sleeve is configured to flex radially outward relative to the third wall section and the first wall section is configured to flex radially inward relative to the second wall section to form an enlarged blind head when the first wall section of the sleeve is forced into engagement with the tapered ramp by the corebolt and wherein the tapered ramp is adapted to flex radially inward to allow the enlarged blind head to move along the body.

13. The fastener of claim 12, wherein the corebolt is configured to include a region of reduced diameter and the tapered ramp is adapted to deflect into the region of reduced diameter to allow the enlarged blind head to move along the body.

14. The fastener of claim 12, wherein the third wall section of the sleeve is formed to include threads and the corebolt is formed to include threads positioned for engagement with the threads of the third wall section.

15. The fastener of claim 12, wherein the corebolt is formed to include an enlarged head positioned for engagement with the third wall section of the sleeve.

16. The fastener of claim 12, wherein the second end of the sleeve is formed to include a lip configured to surround an end portion of the tapered ramp to align the sleeve with the tapered ramp.

17. The fastener of claim 12, wherein the first wall section extends in a substantially radial direction to at least partially define the enlarged blind head.

\* \* \* \* \*